(12) United States Patent
Ishida (10) Patent No.: US 7,251,986 B2
(45) Date of Patent: Aug. 7, 2007

(54) SEALED CONDITION INSPECTION DEVICE

(75) Inventor: Toshiro Ishida, Gotemba (JP)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 10/500,001

(22) PCT Filed: Dec. 25, 2002

(86) PCT No.: PCT/JP02/13497

§ 371 (c)(1),
(2), (4) Date: Mar. 11, 2005

(87) PCT Pub. No.: WO03/058189

PCT Pub. Date: Jul. 17, 2003

(65) Prior Publication Data

US 2005/0151529 A1    Jul. 14, 2005

(30) Foreign Application Priority Data

Dec. 28, 2001   (JP) .............................. 2001-400523

(51) Int. Cl.
*G01M 3/40* (2006.01)
(52) U.S. Cl. ....................................................... 73/52
(58) Field of Classification Search .................... 73/52
See application file for complete search history.

(56) References Cited

U.S. PATENT DOCUMENTS 4,243,932 A * 1/1981 Kakumoto et al. ......... 324/557
5,760,295 A * 6/1998 Yasumoto ................... 73/49.3
6,288,554 B1* 9/2001 Yasumoto ................... 324/558
6,794,885 B1* 9/2004 Yasumoto ................... 324/557

FOREIGN PATENT DOCUMENTS

| JP | 8-240569 | 9/1996 |
|---|---|---|
| JP | 2000-35373 A | 2/2000 |
| JP | 2002-39907 A | 2/2002 |
| JP | 2000-243702 A | 8/2002 |

OTHER PUBLICATIONS

International Search Report for PCT/JP02/13497.

* cited by examiner

*Primary Examiner*—Hezron Williams
*Assistant Examiner*—Paul M. West
(74) *Attorney, Agent, or Firm*—Buchanan Ingersoll & Rooney PC (57) ABSTRACT

A sealed condition inspecting device comprising a support unit for supporting an element to be inspected for a sealed condition, a pair of electrodes in contact with the portion to be inspected of the element to be inspected and supported by the support unit, an electrical variable detecting unit for detecting an electrical variable in the portion to be inspected, and a sealed condition judging means for judging the acceptability of a sealed condition based on the electrical variable. In fact, since the acceptability of a sealed condition is judged based on an electrical variable in the portion, to be inspected, whether or not a defective sealed condition has occurred can be determined independently of the subjectivity of the operator, whereby a sealed condition can be inspected for a sealed condition without unpacking them, not only inspection work can be simplified but reliability in the quality of an element to be inspected can be improved.

12 Claims, 8 Drawing Sheets

SEALED CONDITION INSPECTION DEVICE

This disclosure is based upon Japanese Application No. 2001-400523, filed Dec. 28, 2001, and International Application No. PCT/JP02/13497, filed Dec. 25, 2002, the contents of which are incorporated herein by reference.

FIELD OF THE INVENTION

The present invention relates to the sealed condition inspection device.

BACKGROUND ART

The packaging container containing liquid food, such as milk and soft drinks, has been manufactured by using a web-like packaging material or a packaging container blank-like packaging material and sealing the predetermined part of each packaging material with heat sealing or ultrasonic sealing, etc. For instance, the packaging container was formed by making the packaging material into a tube-like material, sealing the material in the vertical direction using the vertical sealing device as the 1st sealing device, sealing the material transversally using the transversal sealing device as the 2nd sealing device at the predetermined length while filling liquid food into the material, cutting the material to form the original packaging container with the brick-like shape, and then forming the original packaging container again to complete forming the packaging container.

The packaging material is sealed by pinching with the predetermined pinching pressure and applying heat on the surface to melt the resin. However, poor sealing may occur when the melted resin escapes from the sealed part and sufficient amount of resin does not remain on the sealed part according to the pinch pressure, sealing temperature, and resin type. With poor sealing, liquid food in the packaging container may leak or the quality of liquid food may deteriorate since air enters into the packaging container.

Thus, an operator must select a sealed packaging container and discharge liquid food from the packaging container, unpack the packaging container, and inspect the sealed part of the packaging container by viewing from the inside of the packaging container.

However, with the above-mentioned sealed condition inspection, the sealed condition cannot be judged properly since the judgements vary according to the operator's subjectivity.

SUMMARY OF THE INVENTION

The object of the present invention is to provide the sealed condition inspection device enabling accurate sealed condition inspection by solving conventional problems of the sealed condition inspection method. To achieve the object, the sealed condition inspection device of this invention comprises a support unit for supporting an element to be inspected for a sealed condition, a pair of electrodes in contact with the portion to be inspected and supported by the support unit, an electrical variable detecting unit for detecting an electrical variable in the portion to be inspected, and a sealed condition device for judging the sealed condition based on the electrical variable.

Another embodiment of the sealed condition inspection device of this invention discloses a support unit being established in a conveyor for conveying an element to be inspected.

Another embodiment of the sealed condition inspection device of this invention discloses a receiving plate as the support unit for mounting an element to be inspected.

Another embodiment of the sealed condition inspection device of this invention discloses at least one electrode being disposed movably and can be located at the inspection position and the retreat position.

Another embodiment of the sealed condition inspection device of this invention discloses at least one electrode comprising a plurality of electrode elements.

PREFERRED EMBODIMENT OF THE INVENTION

Detailed description of the preferred embodiment of the present invention is explained with the accompanying drawings. Although the sealed condition inspection device used to detect the sealed condition of the brick-shape packaging container is used for describing this invention, the description can be applied to the sealed condition of other packaging containers.

Figure 2:
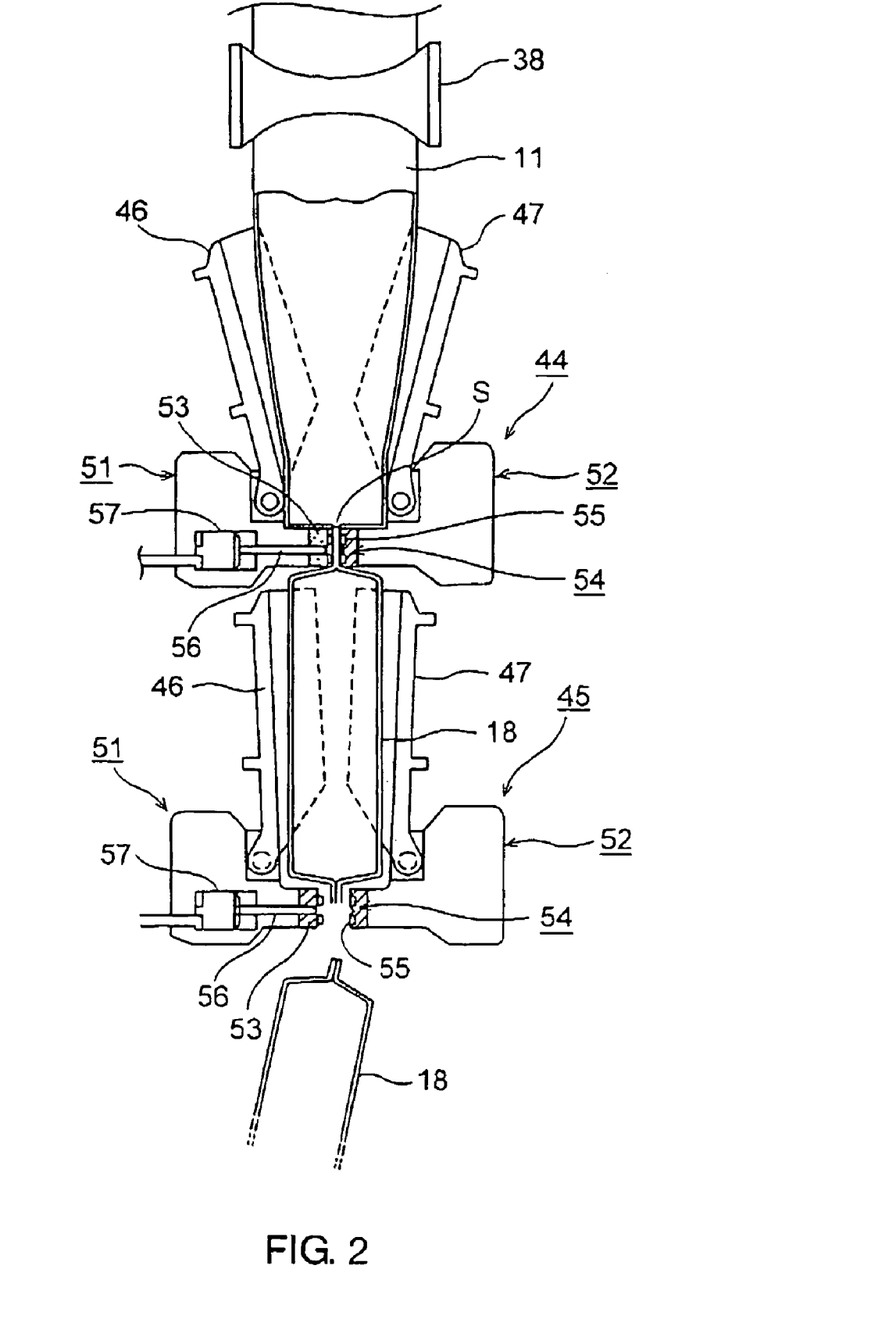
FIG. 2 is a conception diagram showing the feature of the filling up machine in the embodiment of this invention.
Figure 3:
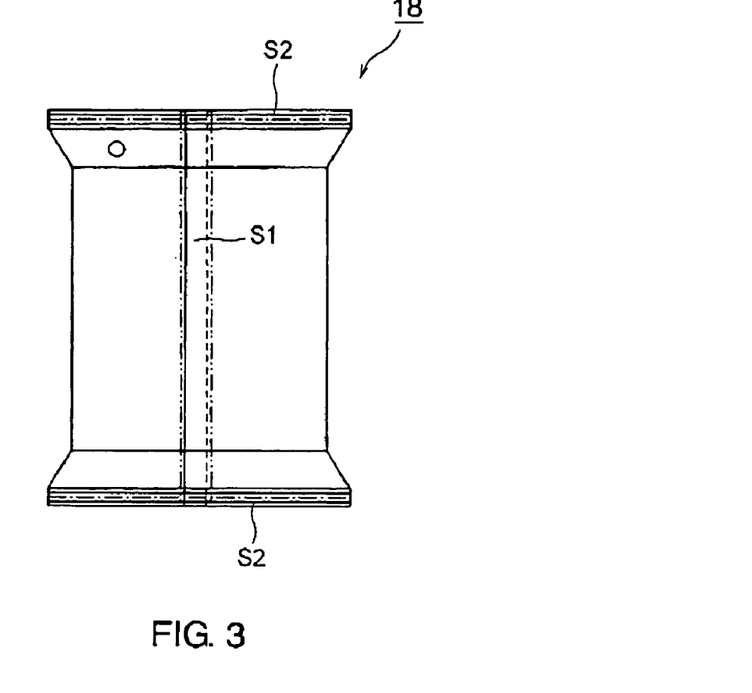
FIG. 3 is the front view of an original packaging container in the embodiment this invention.
Figure 4:
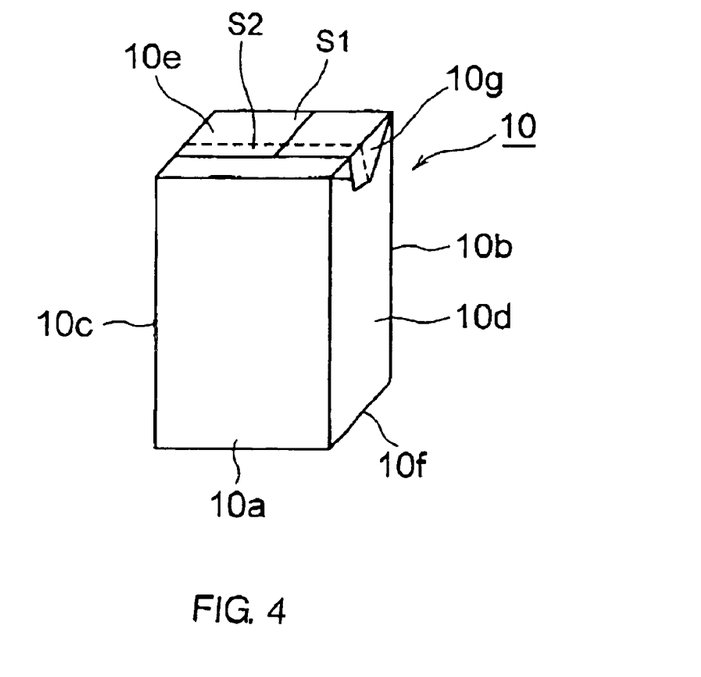
FIG. 4 is a perspective diagram of a packaging container of the embodiment of this invention.

FIG. 2 is a conception diagram showing the feature of the filling up machine of the embodiment of this invention. FIG. 3 is the front view of an original packaging container of this invention. FIG. 4 is a perspective diagram of a packaging container of the embodiment of this invention.

The packaging material having the web-shape, which is manufactured by the not-illustrated packaging material making machine, is set to the not-illustrated delivery machine, and then the material is conveyed using the feeder.

The not-illustrated punch hole is provided on the packaging material while the material is being conveyed and the not-illustrated inner tape or pull-tab is attached to cover the punch hole. The packaging material is conveyed in the vertical direction with the not-illustrated forming rings arranged at several positions in the direction that the packaging material is conveyed. Then, the material is formed into the packaging-material tube 11 and sealed using the vertical sealing device as the first sealing device. As shown in FIG. 3, the sealed portion S1 is formed as the first sealed portion.

Then, liquid food is supplied to the packaging material tube 11 via the filling tube. The packaging material tube 11 is pinched by the first sealing jaw 44 and the second sealing jaw 45, that are components of the second sealing device, and the tube is sealed transversally at a certain interval. Then, the tube is formed into the pillar shape to form the original packaging container 18.

Both the first sealing jaw 44 and the second sealing jaw 45 have the cutting jaw 51 and heat sealing jaw 52. In this case, the packaging material tube 11 is conveyed downwardly and the first sealing jaw 44 and the second sealing jaw 45 having the same structure alternately work by shifting for ½ cycle of the process of the jaws in order to improve the processing speed of the filling machine.

The cutting jaw 51 has the cutting bar 53 (the right side of FIG. 2) on the front end of the jaw, and the heat-sealing jaw 52 has the sealing block (inductor insulator) 54, which has two indicators 55, on the front end of the jaw. The transversally sealed portion S2, which is formed as the second sealed portion and has two sealing lines, is formed by advancing the cutting jaw 51 and the heat sealing jaw 52 is advanced, and contacting the facing surfaces of the packaging tube 11 by pinching the tube using the cutting bar 52 and the sealing block 54.

The flat cutter knife 56 extending transversally is provided on the center of the cutting jaw 51 to freely move (moving in left and right directions in FIG. 2). The cutter knife 56 (moving in the right direction in FIG. 2) can cut the sealed portion between the two lines of the transversally sealed portion S2.

The cylinder 57 is provided on the rear end of the cutter knife (left side of FIG. 2) and the cutter knife 56 advances/retreats by providing/exhausting air to the cylinder.

The cutting jaw 51 and the heat sealing jaw 52 has a pair of the forming flaps 46 and 47 provided to freely swing and guide the packaging material tube 11 by surrounding the tube.

The cutting jaw 51 and the heat sealing jaw 52 advance and both ends of the packaging material tube 11 contact when the first sealing jaw 44 is at the sealed portion cutting start position in FIG. 2. The first sealing jaw 44 descends while pinching the packaging material tube 11 and the transversally sealed portion S2 and the original packaging container 18 are formed as the jaw descends.

The second sealing jaw 45 makes the cutter knife 56 advance in front of the sealed portion cutting end position and cut the portion between two sealing lines of the transversal sealed part S2 to separate the original packaging container 18 when the jaw is at the sealed part cutting end position.

The cutting jaw 51 and the heat-sealing jaw 52 of the second sealing jaw 45 retreat and move upwardly to the sealed portion cutting start position after cutting the portion between two sealing lines of the transversally sealed portion S2. The cutter knife 56 of the first sealing jaw 44 advance to cut the portion between two sealing lines to remove the original packaging container 18 when the cutting jaw 51 and the heat sealing jaw 52 advance from the sealed portion cutting start position.

In addition, the not-illustrated cylinder mechanism is arranged on the first and the second sealing jaws 44 and 45, so that the cutting jaw 51 and the heat-sealing jaw 52 pull each other at the sealed portion cutting start position and the pinching pressure becomes high, by supplying, for example, compressed air into the cylinder mechanism.

The original packaging container 18 is formed into the predetermined form in accordance with the formed fold and the packaging container is formed into the brick-type packaging container 10 containing the predetermined amount of liquid food. The packaging container comprises a front wall 10a, a rear wall 10b, side walls 10c and 10d, a top surface wall 10e and a base wall 10f, an ear piece 10g (one ear piece is shown in FIG. 4) folded from 10e to 10c and 10d sides and an ear piece folded from 10c and 10d to 10f side.

In this case, the vertically sealed portion S1 is formed with the top surface wall 10e, the rear wall 10b, and the base wall 10f. The transversally sealed portion S2 is formed with the top surface wall 10e and the ear piece 10g on the top surface wall 10e and the bottom wall 10f and the ear piece on the bottom wall 10f.

The packaging material has a lamination structure in a direction from outside to inside when the packaging container is formed. The lamination structure comprises a first resin layer formed as the inner resin layer, such as polyethylene, the aluminum foil layer used as the barrier layer, the paper base, and a second resin layer, such as polyethylene, used as the outer layer. The resin layer (e.g., polyester) can be used as the barrier layer instead of the aluminum foil layer. In addition, 38 is the guiding roller guiding the packaging material tube 11.

The packaging material is sealed by attaching the resin layers of the first layer by pinching the material with the predetermined pinching pressure using the cutting jaw 51 and the heat sealing jaw 52 and applying heat on the surface of the material to melt the resin or subjecting the material to supersonic wave. The poor sealing may occur when the melted resin escapes from the transversally sealed portion S2 and a sufficient amount of resin does not remain on S2 according to the pinching pressure, sealing temperature, and resin type. With poor sealing, liquid food in the packaging container 10 may leak or the quality of liquid food may deteriorate since air enters into the packaging container 10.

Thus, the sealed condition inspection device is disposed to inspect the sealed condition. The sealed condition inspection device has two modes, i.e., automatic mode and manual mode. The packaging container 10, which is extracted from the filling machine, is delivered to the first sealed condition inspection part and the transversally sealed portion S2 is automatically inspected in automatic mode.

Figure 1:
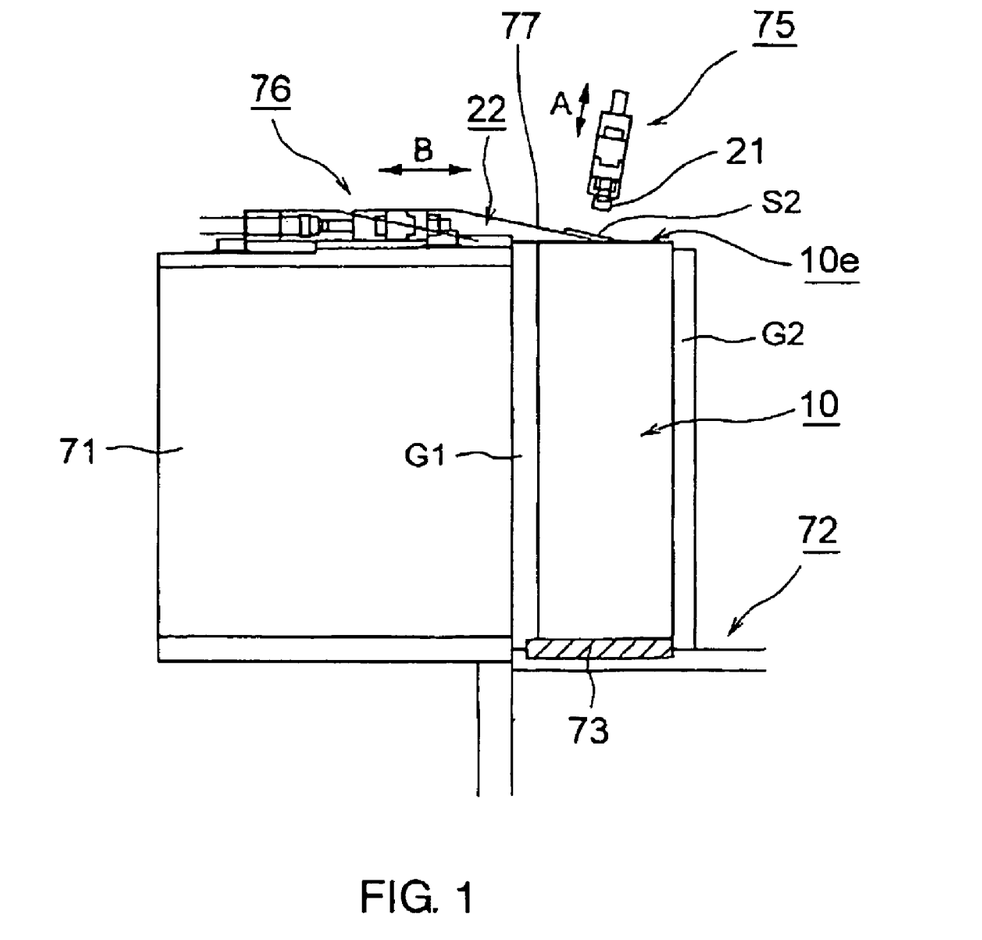
FIG. 1 is an illustration of appearance of the first sealed condition inspection device in the embodiment of this invention.
Figure 5:
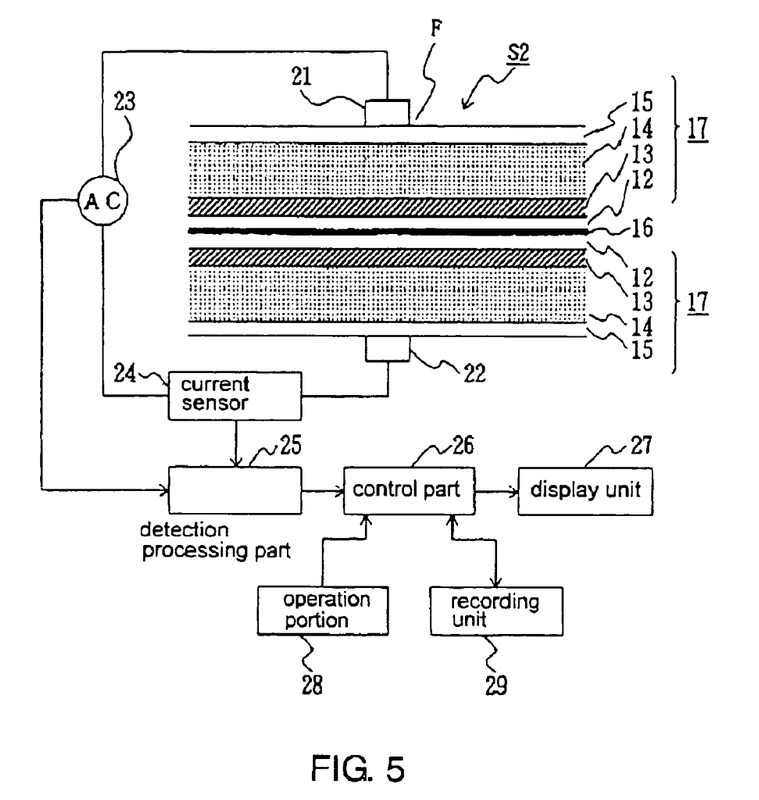
FIG. 5 is a conception diagram of the sealed condition inspection device of the embodiment of this invention.
Figure 6:
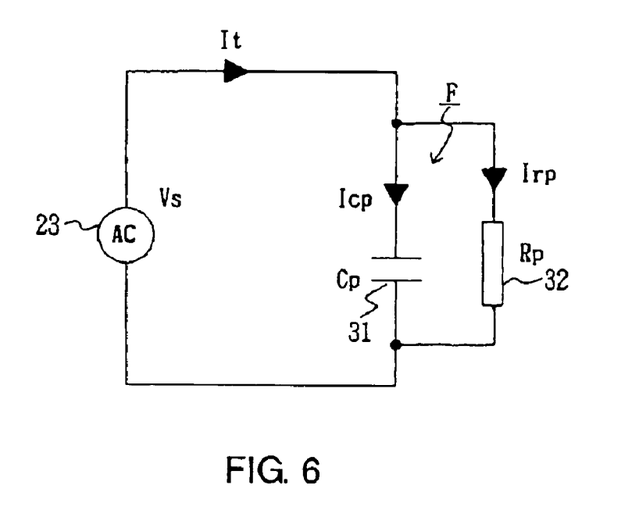
FIG. 6 is a conceptual diagram of the principle of the sealed condition inspection method of the embodiment of this invention.
Figure 7:
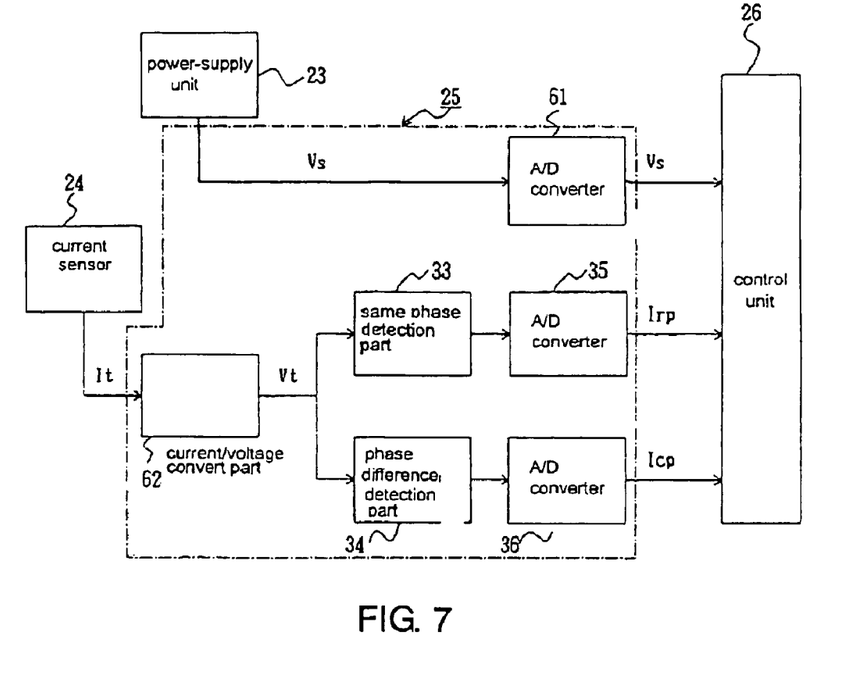
FIG. 7 is a block diagram of the sealed condition inspection device of the embodiment of this invention.
Figure 8:
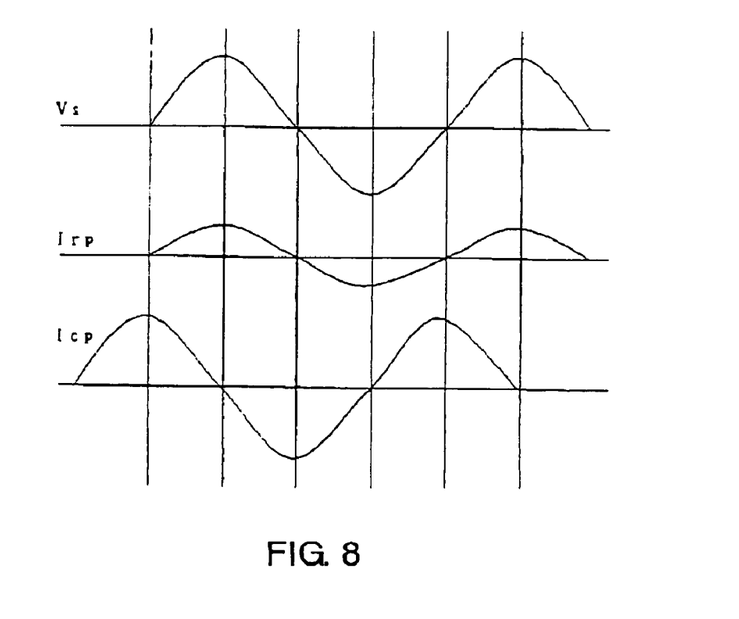
FIG. 8 is a waveform chart showing movement of the sealed condition inspection device of the embodiment of this invention.

FIG. 1 is an illustration of appearance of the first sealed condition inspection device in the embodiment of this invention. FIG. 5 is a conception diagram of the sealed condition inspection device of the embodiment of this invention. FIG. 6 is a conceptual diagram of the principle of the sealed condition inspection method of the embodiment of this invention. FIG. 7 is a block diagram of the sealed condition inspection device of the embodiment of this invention. FIG. 8 is a wave form chart showing movement of the sealed condition inspection device of the embodiment of this invention.

In the drawing, 71 is the control unit, 72 is the conveyor disposed on the back of the control unit 71, and 73 is the conveyor conveying the element to be inspected, which is formed by the insulating material, and operating with the not-illustrated conveyor motor. The first sealed condition inspection part is disposed on the predetermined positions on the conveyor 73 and the conveyor 73 works as the support unit for the packaging container 10. The control unit 71 is disposed on the first sealed condition inspection part.

In addition, the guides G1 and G2, that are formed with the insulating material, are disposed on the front side and the rear side of the device along with the lines of the conveyor 73 in the first sealed condition inspection part and the guides hold the packaging container 10.

In the first sealed condition inspection part, a pair of the first and the second electrode parts (75, 76) are disposed on the not-illustrated supporting holder located on the upper part of the packaging container 10. The electrode parts advance/retreat in A and B directions in FIG. 1 by driving the not-illustrated first and the second driving parts comprising air cylinder and so on. The electrode parts move to the inspection position when the parts advance. On the other hand, the electrode parts move to the retreat position when the parts retreat. The electrodes 21, 22 are disposed on the tip of the electrode parts 75 and 76, respectively.

Although the original packaging container 18 is formed into the packaging container 10 by forming along the predetermined fold, the ear piece 10g is attached on the side walls 10c and 10d after the transversally sealed part S2 is tilted to the front wall 10a side if the transversally sealed portion S2 has one of the form shown in FIG. 1 or FIG. 4. The top surface wall 10e has the vertical sealed portion S2 tilted to the front wall 10a side.

Thus, the packaging container 10 is set on the conveyor 71 in the way that the front wall 10a of the packaging container to be appeared when conveying the packaging container to the first sealed condition inspection part. When the packaging container 10 reaches the first sealed condition inspection part, the vertically sealed portion S2 moves up from the top surface wall 10e and the portion is slightly tilted toward the top surface wall.

Therefore, the shape of the second electrode 22 is similar to a wedge and the electrode is formed to tilt the inspection surface 77 toward the top surface of the device. In addition, the electrode part 75 advances/retreats perpendicular to the inspection surface 77.

Therefore, the second electrode 22 is inserted into the lower part of the transversally sealed portion S2, which is slightly tilted to the top surface wall, to attach the electrode to the part, and the first electrode 21 is abutted to the upper part of the transversally sealed portion S2 when both of electrode parts 75 and 76 are at the inspection position.

The sealed condition inspection device has two operation modes, i.e., automatic code and manual mode. The packaging container 10 is stopped by the not-illustrated stopper when the packaging container reaches the first sealed condition inspection portion and the motor conveying the packaging container also stops.

When the electrode parts 75 and 76 advance to the inspection portion, the first electrode portion 75 presses the first electrode 21 to the transversally sealed portion S2. When the inspection finishes, the electrode parts 75 and 76 retreat to the retreat position. The motor for conveying the packaging container is activated again and the packaging container 10 is conveyed with the conveyor 73. In this case, the packaging container 10 having poor sealed condition is automatically extracted from the line with the judging device disposed below the first sealed condition inspection portion.

The following part describes the operation of the sealed condition inspection device.

In FIG. 5, S2 is the transversally sealed portion, 17 is the packaging material comprising the first resin layer 12, the aluminum foil layer 13, the paper matrix 14, and the second resin layer 15. When the packaging material tube 11 (FIG. 2) is sealed transversally, the cutting jaw 51 and the heat sealing jaw 52 advance and the packaging material tube 11 is pinched or oscillated with the supersonic wave. In this case, both the first resin layers 12 contact and the resin on the layers, such as polyethylene, are welded, so that the welding portion 16 is formed.

Two packaging materials 17 are bonded at the welding portion 16 in the transversally sealed portion S2 and the portion has the function of condenser 31 since each of the first and the second resin layers 12, 15 etc. comprise dielectric materials. If the resin, such as polyester, is used for the barrier layer, the barrier layer also comprises dielectric materials. In addition, the adhesive layer comprises the not-illustrated glue between the aluminum foil layer 13 and the paper matrix 14. The adhesive layer also consists of dielectric materials.

The alternating current is supplied to the element F to be inspected, which is used to inspect the transversally sealed portion S2. With the capacitance and the loss factor of the element F to be inspected, the sealed condition inspection device inspects the sealed condition.

Therefore, the sealed condition inspection device comprises a pair of the first and the second electrode parts 75 and 76, the power-supply unit (AC) 23 generating the alternating current applied to the element F to be inspected, the current sensor 24 detecting the capacitance and the loss factor of the element F to be inspected, the detection processing part 25 reading the voltage generated by the power-supply unit 23 and the current detected by the current sensor 24, the control part 26 having the CPU controlling the sealed condition inspection device, the first display unit 27 having a display, the operation portion 28, and the recording unit 29 recording the predetermined data etc. In addition, the current sensor 24 detects the alternating current flowing in the element F to be inspected. The power-supply unit 23 detects the generated alternating current and the not-illustrated voltage sensor can detect the alternating voltage as electric variables.

The first and the second electrodes 21 and 22 having conductive materials are arranged in facing relation. When the sealed condition of the material to be inspected has the predetermined area, the element F to be inspected is pinched and pressed with the predetermined pressure. The electrodes 21 and 22 are connected through the power-supply unit 23 and the current sensor 24 and the voltage generated by the power-supply unit 23 is applied to the element F to be inspected.

The voltage applied to the element F to be inspected is set in response to the property of the packaging material 17, such as the material or thickness of the first resin layer 12, the aluminum foil layer 13, the paper matrix 14, and the second resin layer 15. When the voltage is applied to the element F to be inspected, the equivalent circuit as shown in FIG. 6 is formed with the power-supply unit 23 and the element F to be inspected. In this case, the element F to be inspected has the parallel circuit wherein the condenser 31 having the capacitance of Cp is arranged in parallel with the internal resistance 32 having the resistance of Rp. When the condenser 31 and the internal circuit 32 are connected in the equivalent circuit, whether they are connected in series or parallel is decided in accordance with the impedance of the condenser 31 and the internal resistance 32. If the impedance of the internal resistance 32 is extremely larger than that of the condenser 31 like the transversally sealed portion S2, the internal resistance and the condenser are connected in parallel.

When the area of the electrodes 21 and 22 is set as "s", the thickness of the element F to be inspected, that is, the distance between the distance of the load electrodes (distance between the first electrode and the second electrode), is set as "d", and the dielectric constant is set as "ϵ", the capacitance is obtained by $$Cp = \epsilon S/d.$$

In this case, the amount of the capacitance Cp changes in the element F to be inspected since the dielectric constant ϵ changes according to changes of the property of the packaging material 17, such as the material or the thickness of the first resin layer 12, the aluminum foil layer 13, the paper matrix 14, and the resin layer 15. The amount of the capacitance Cp significantly changes in the element F to be inspected and the dielectric constant ϵ in the element F to be inspected significantly changes when the property of the layers made of dielectric materials, such as the material or the thickness of the first resin layers 12 and 15, the aluminum foil layer 13, and the paper matrix 14 change.

In addition, the capacitance Cp of the material to be inspected changes according to the distance between load electrodes since the distance changes according to the change of the sealing condition for the transversally sealed portion S2, such as the melting temperature of the resin and the pinching pressure with the cutting jaw 51 and the heat sealing jaw 52. The higher the melting temperature or the pinching pressure, the larger amount of the melted resin that escapes to both sides of the transversally sealed portion S2, so that the thickness of the welding portion 16 becomes thinner. Therefore, the distance between the load electrodes d become shorter and the amount of the capacitance Cp increases.

When sealing the transversally sealed portion S2, the capacitance Cp in the element F to be inspected changes according to the melting degree of the welding portion 16. When resin layers 12 are melted and the packaging material 17 are attached, the amount of the resin in the transversally sealed portion S2 decreases and the distance between the load electrodes d become shorter, so that the capacitance Cp of the material F to be inspected increases. When the first resin layer 12 may not be melted even if the resin layers look melted, little welding portion 16 is formed. Since the first resin layers 12 are attached together, the amount of the resin on the transversally sealed portion S2 does not decrease. Therefore, the distance D between the load electrodes and the capacitance Cp also does not change.

When the length of the sealing line used for transversally sealing the device changes, the area that the first and the second electrodes 21 and 22 contact and the area S of the electrodes 21 and 22 change, so that the capacitance Cp of the element F to be inspected changes. The form of the first and the second electrodes is set not to project outwardly from the transversally sealed portion S2. It is preferable to set the width of the first and the second electrodes 21, 22 as W and the length of the electrodes as 2W when the sealing width of the transversally sealed portion S2 is set as W. When the electrodes 21, 22 project outwardly from the transversally sealed portion S2, the condition of the melted resin in the inside of the transversally sealed portion S2 is different from the outside of the portion, so that the accuracy of the sealed condition inspection become low.

The capacitance Cp can be used as the judging element of the sealed condition since the capacitance Cp of the element F to be inspected changes according to the property of the packaging material 17, the sealing condition for the transversally sealing device, the sealing method, and the structure of the device and so on.

Therefore, the voltage Vs generated by the power-supply unit 23 is set according to the property of the packaging material 17, the sealing condition for the transversally sealing device, the sealing method, and the structure of the device and so on.

The impedance Zc of the condenser 31 can be obtained by $$Zc = 1/(2\pi \cdot f \cdot Cp) \qquad (1)$$

when the voltage Vs of the frequency F is applied to the element F to be inspected using the power-supply unit 23, and the current flowing the condenser 31 is set as Icp and the current flowing the internal resistance 32 is set as Irp. In this case, the current Icp can be obtained by $$Icp = Vs/Zc = 2 \cdot f \cdot Cp \cdot Vs \qquad (2)$$

and the capacitance can be obtained by $$Cp = Icp/(2\pi \cdot f \cdot Vs) \qquad (3).$$

In addition, the voltage Vs is applied to the element to be inspected, the current Icp is applied to the first element to be inspected, and the current Irp is applied to the second element to be inspected.

When the loss factor in the element F to be inspected is set as D, the loss factor can be obtained by $$D = 1/(2\pi \cdot f \cdot Cp \cdot Rp) \qquad (4)$$

and the resistance Rp of the internal resistance 32 can be obtained by $$Rp = 1/(2\pi \cdot f \cdot Cp \cdot D) \qquad (5).$$

Since current Irp flowing into the internal resistance 32 is $$Irp = Vs/Rp \qquad (6),$$

the current can be obtained by substituting the formula (6) in the formula (5):

$$Irp = (2\pi \cdot f \cdot Cp \cdot D) \cdot Vs \qquad (7).$$

In addition, the formula will be Irp=Icp·D when the formula (3) is substituted in the formula (7), so that the loss factor can be obtained by $$D = Irp/Icp \qquad (8).$$

Therefore, the loss factor can be obtained with the ratio of the current Irp to the current Icp, so that the loss factor can be used for judging the sealed condition.

The current It showing the electrical variable in the element F to be inspected can be obtained by $$It = Icp + Irp \qquad (9).$$

Since the capacitance can be obtained with the formula (3) and the loss factor can be obtained with the formula (8), the capacitance Cp and the loss factor D can be calculated when the voltage Vs and the current Icp and Irp are obtained.

In this case, the value of the condenser 31 is the same as the value of the internal resistance 32 in the element F to be inspected, so that it is impossible to detect the value of the condenser and the internal resistance at outside of the element F to be inspected.

Therefore, the current Icp and Irp can be calculated based on the current It detected using the current sensor 24. The current Irp has the same phase as the voltage Vs applied to the element F to be inspected as shown in FIG. 8 since the current is applied to the internal resistance 32. On the other hand, the phase of the current Icp is shifted for 90[°] from the voltage Vs since the current Icp is applied to the condenser 31. Therefore, the current It (the voltage Vt generated by converting the current It to the voltage Vt) is applied to the phase separation circuit to separate the current Icp and the current Irp.

The detection processing part 25 comprises the A/D converter 61 reading the voltage Vs generated by the power-supply unit 23 and performing the analog/digital conversion, the current/voltage convert part 62 converting the current It to the voltage Vt after reading the current It, the same phase detection part 33 detecting the same phase as the voltage Vs in the voltage Vt, the phase difference detection part 34 detecting the phase difference of the voltage Vs, the A/D converter 35 performing the analog/digital conversion after reading the same phase detected using the same phase detection part 33, and the A/D converter 36 performing the analog/digital conversion after reading the different phase detected using the phase difference detection part 34. The phase separation part has the phase separation circuit comprising the same phase detection part 33 and the phase difference detection part 34.

The A/D converter 61 outputs the voltage Vs comprising digital signals, the A/D converter 35 outputs the current Irp comprising digital signal and the A/D converter 36 outputs the current Icp comprising digital signals. The output voltage Vs and the current Icp and Irp are transmitted to the control unit 26. In addition, the applied voltage detection part comprises A/D converter 61, the first current detection part for the material to be inspected comprises the phase difference detection part 34 and the A/D converter 36, and the second current detection part for the material to be inspected comprises the same phase detection part 33 and the A/D converter 35.

The control unit 26 reads frequency f, voltage Vs and current Icp and Irp set in the power-supply unit 23 and the not-illustrated capacitance calculation processing mean calculates the capacitance Cp with the formula (3). The control unit 26 of the not-illustrated loss factor calculation processing means performs the loss factor calculation to calculate the loss factor D with the formula (8).

The recording unit 29 records the standard capacitance Cpref and the standard loss factor Dref obtained by considering the type of the packaging material 17, the sealing condition for the transversally sealing device, the sealing method, and the structure of the device and so on.

The not-illustrated first sealed condition judging device in the control part 26 performs the first sealed condition judging process and compares the calculated capacitance Cp with the standard Cpref by referring to the table, then judges whether the deviation $$\Delta Cp = |Cp - Cpref|$$

is less than the threshold Cpth or not.

When the deviation $\Delta Cp$ is less than the deviation Cpth, the sealed condition is judged as good. On the other hand, the sealed condition is judged as bad when the deviation $\Delta Cp$ is less than the threshold Cpth. The sealed condition can be judged using the first sealed condition judging device.

The not-illustrated second sealed condition judging device in the control part 26 performs the second sealed condition judging process and compares the calculated loss factor D with the standard Dref by referring to the table, then judges whether the deviation $$\Delta D = |D - Dref|$$

is less than the threshold Dth or not. When the deviation $\Delta D$ is less than the deviation Dth, the sealed condition is judged as good. On the other hand, the sealed condition is judged as bad when the deviation $\Delta D$ is less than the threshold Dth.

The sealed condition can also be judged using the second sealed condition judging device.

In this embodiment, the sealed condition is judged with the first judging processing or the second judging process. However, it is possible to judge the sealed condition using both of the sealed condition judging processes.

The following part describes the control unit 71.

Figure 9:
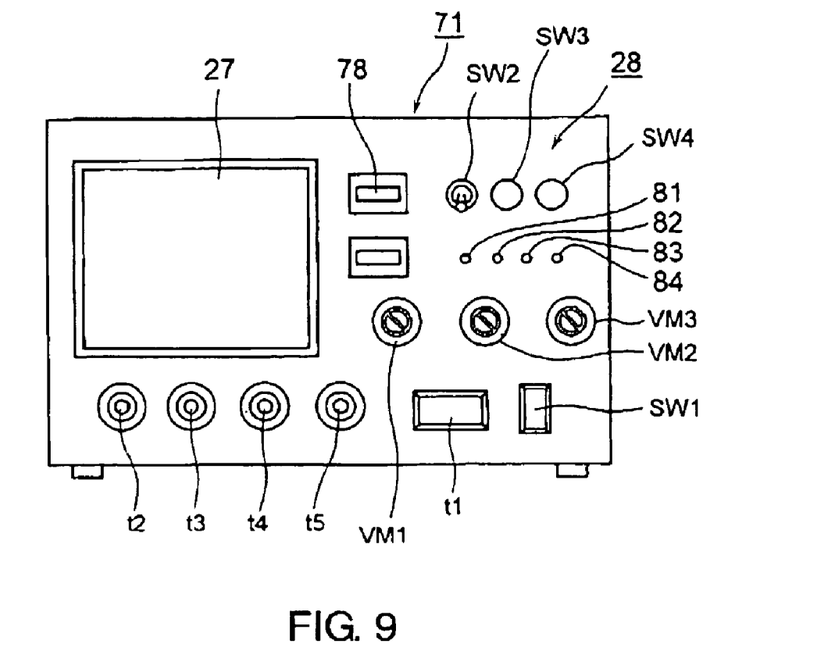
FIG. 9 is a figure showing the front panel of the control unit of the embodiment of this invention.

FIG. 9 is a figure showing the front panel of the control unit of the embodiment of this invention.

In FIG. 9, 71 is the control unit, 27 is the display unit, 28 is the operation position, SW1 is the main switch used for switching on/off the control unit, Sw2 is the mode switch used for switching auto mode and manual mode, Sw3 is the switch used for switching on/off the first and the second electrodes 21 and 22, SW4 is the switch for selecting a plural of electrode elements constituting the first and the second electrodes 21 and 22, t1 is the junction terminal connecting the control unit 26 and the control unit 71, t2-t5 are junction terminals connecting electrodes 21 and 22 (FIG. 1) and the control unit 71, 78 is the timer, 81-84 are LED lamps, VM1 is the first setting volume of the voltage Vs generated by the power-supply unit 23 (ex. 8 [V]), VM2 is the second setting volume of the frequency F (ex. above 100 [kHz]) of the power-supply unit 23, and VM3 is the third setting volume used for setting the threshold of the capacitance Cp having $\Delta Cp$ of the deviation and the threshold Dth of the loss factor having $\Delta D$ of the deviation. In this case, the number of the Cpth and Dth can be set in the range of 0-10. The LED indication lamps 81-84 illuminate to warn the operator.

The following part describes the first electrode 21 and the second electrode 22.

Figure 10:
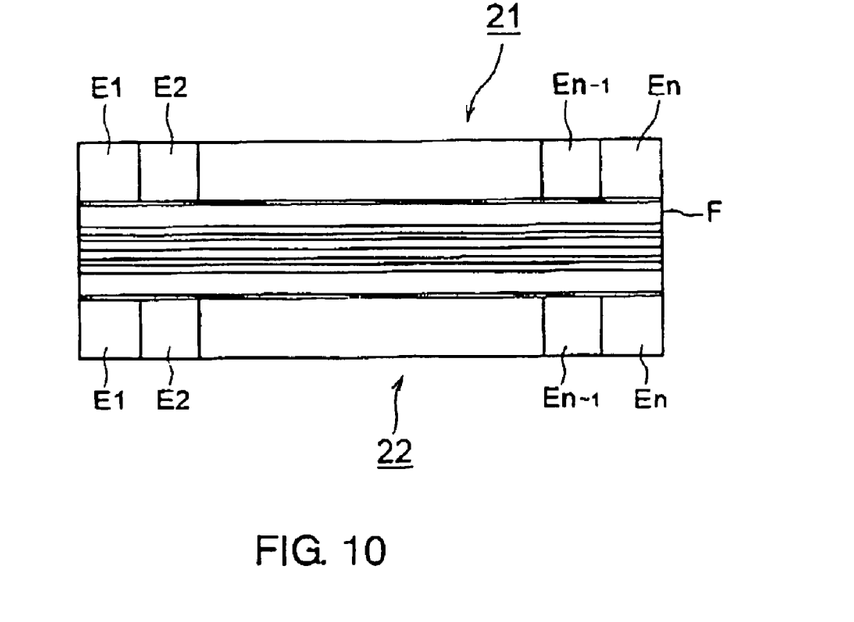
FIG. 10 is a figure showing electrode structure of the embodiment of this invention.

FIG. 10 is a figure showing electrode structure of the embodiment of this invention.

In FIGS. 10, 21 and 22 are the first and the second electrodes arranged across the element F to be inspected. In this case, the first and the second electrodes 21 and 22 have multiple electrodes structure comprising multiple channels and multiple electrode elements Ei (1, 2, . . . , n). Therefore, one electrode element can be selected from electrodes 21 and 22 by using the switch SW4 (FIG. 9), so that it is possible to inspect the sealed condition of the predetermined part of the element F to be inspected only.

Figure 11:
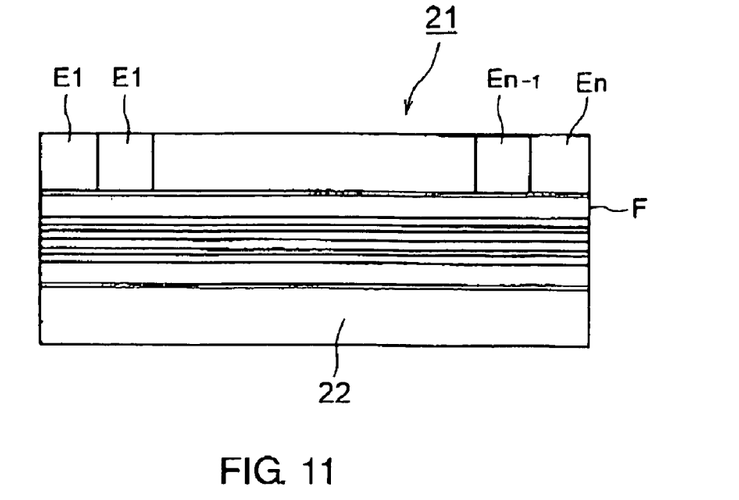
FIG. 11 is a figure showing other electrode structure of the embodiment of this invention.

FIG. 11 is a figure showing other electrode structure of the embodiment of this invention.

In FIGS. 11, 21 and 22 are the first and the second electrodes arranged across the element F to be inspected. In this case, the first electrode 21 has multiple electrodes structure comprising multiple channels and multiple electrode elements Ei, and the second electrode 22 has the single electrode structure comprising one electrode element. Therefore, one electrode element can be selected from electrode elements Ei of the first electrode 21 and the second electrode 22 by using the switch SW4 (FIG. 9), so that it is possible to inspect the sealed condition of the predetermined part of the element F to be inspected only. When poor sealing occurs in several points, the electrode structure shown in FIG. 11 is preferred since it is impossible to specify the positions. In this case, the cost of the sealed condition device can be reduced. The structure of the electrodes 21 and 22 shown in FIG. 10 is preferred when accurate inspection is required. On the other hand, the structure of the electrodes 21 and 22 shown in FIG. 11 is preferred when high accuracy is not required, such as the case that the position having poor sealing is already inspected, etc.

The following section describes the second sealed condition inspection part used to inspect the sealed condition in manual mode.

Figure 12:
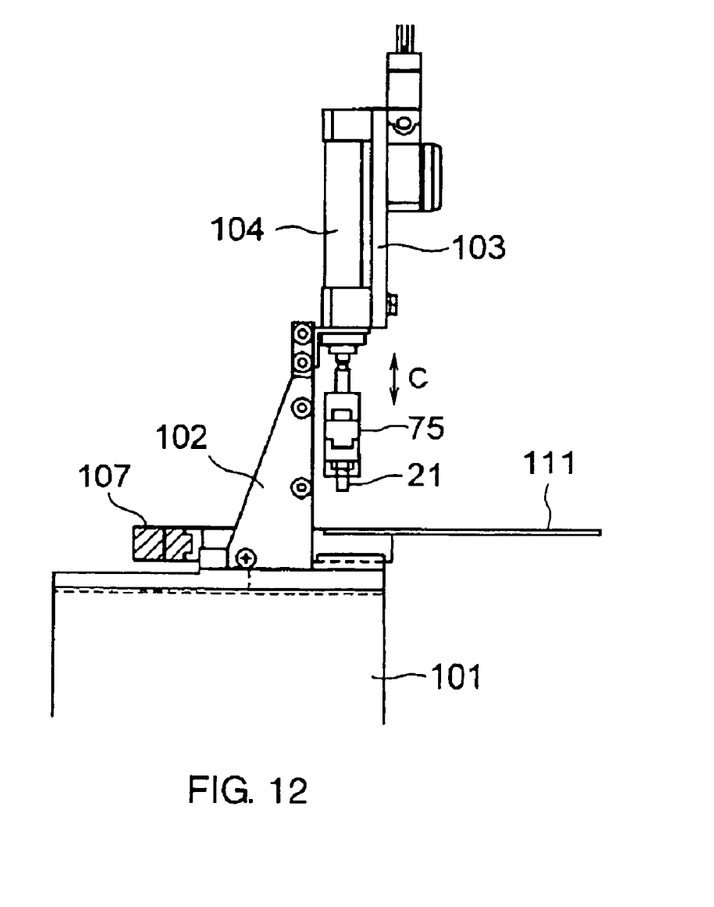
FIG. 12 is front view of the second sealed condition inspection portion of the embodiment of this invention.

FIG. 12 is front view of the second sealed condition inspection portion of the embodiment of this invention.

Figure 13:
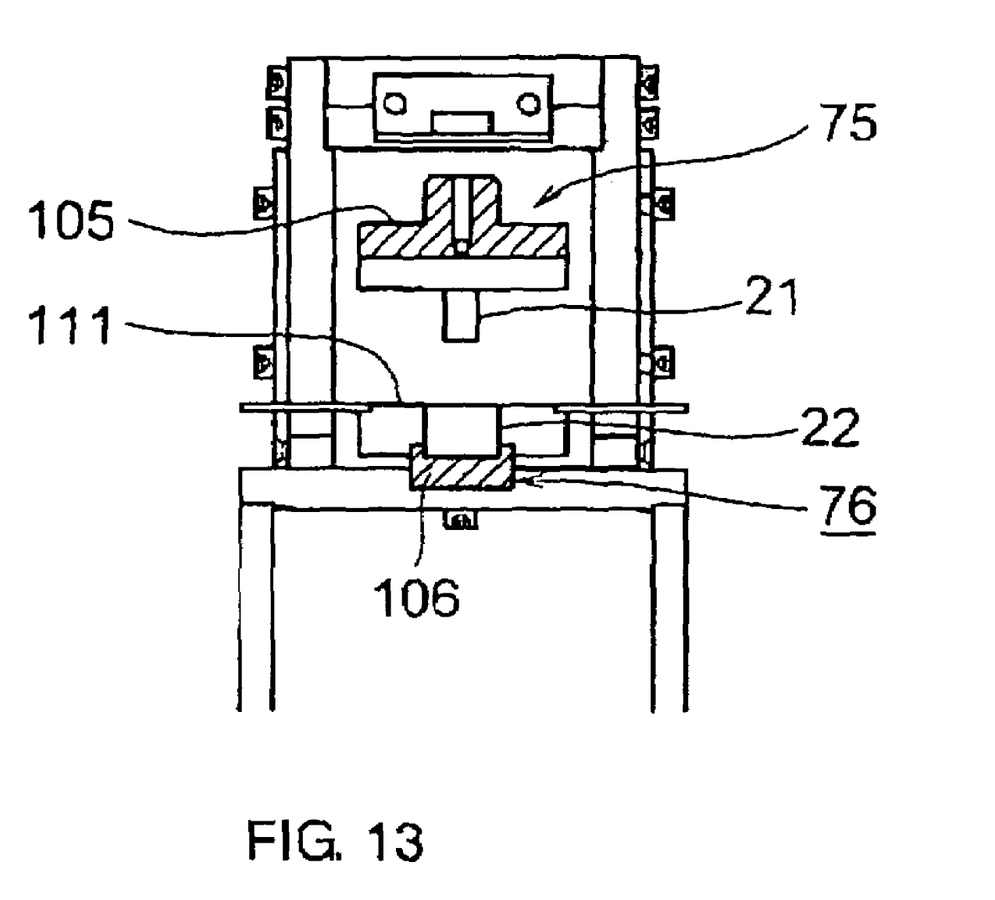
FIG. 13 is a side elevation of the second sealed condition inspection portion of the embodiment of this invention.

FIG. 13 is a side elevation of the second sealed condition inspection portion of the embodiment of this invention.

In the figures, 101 is the frame, 102 is the bracket, 103 is the supporting holder, wherein the first electrode part 175 is disposed on the supporting holder 103 and the second electrode part 176 is disposed on the frame 101 facingly with the first electrode part 175. The first electrode part 175 advances/retreats in the C mark indicated by the arrow mark by driving the driving part 104 comprising the air cylinder, etc. The part advances to the inspection position (moves downward in FIG. 11) and retreats to the retreat position (moves upward in FIG. 11). The first electrode 21 and the second electrode 22 are disposed on the tip of the first electrode part 175 and the second electrode part 176, respectively. In addition, 105 is the insulator used to insulate the first electrode 21 and 106 and 107 are insulators insulating the second electrode 22.

The conductive material is mounted on the second electrode 22 and the receiving board 111 working as the supporting part of the material to be inspected and supporting the packaging container 10 is disposed. The operator can mount the original packaging container 18 (FIG. 2) on the receiving board 111 and locate the first electrode part 175 on the inspection point, and then press the first electrode 21 to the vertically sealed portion S1 or the transversally sealed portion S2 to make the electrode contact with any one of the sealed portions. In this case, the packaging container 10 itself works as the condenser.

In addition, the operator can inspect the sealed condition by extracting liquid food from the original packaging container 18 and putting the empty original packaging container 18 on the receiving board 111.

Therefore, with this invention, the sealed condition is inspected with the current It flowing in the element F to be inspected when the voltage Vs is applied to the material, not by the operator's subjectivity. Therefore, the sealed condition can be accurately inspected.

In addition, it is possible to simplify the inspection process since the sealed condition of the vertically sealed portion S1 and the transversally sealed portion S2 can be inspected without opening the packaging container 10. The reliability for the quality of the packaging container 10 also improves with this process.

Various changes or modifications for this invention may be made without departing from the spirit and scope thereof, it is to be understood that the invention is not limited to the above-mentioned embodiments.

The sealed condition inspection device of this invention comprises a support unit for supporting an element to be inspected for a sealed condition, a pair of electrodes in contact with the portion to be inspected and supported by the support unit, an electrical variable detecting unit for detecting an electrical variable in the portion to be inspected, and a sealed condition device for judging the sealed condition based on the electrical variable.

With this invention, the sealed condition is inspected in accordance with the electronic variable in the element to be inspected, not by the operator's subjectivity. Therefore, the sealed condition can be accurately inspected.

In addition, it is possible to simplify the inspection process since the sealed condition of the material to be inspected can be inspected without opening the material.

The reliability for the quality of the material to be inspected also improves with this process.

INDUSTRIAL APPLICABILITY

The sealing device of this invention can be utilized for the sealed condition inspection device of the packaging container containing liquid food, such as milk and soft drinks.

The invention claimed is:

1. A sealed condition inspection device for inspecting a sealed condition of a sealed portion of a contents containing element, wherein the sealed portion is formed by portions of the element being sealed together comprising
    a support unit for supporting the element to be inspected for the sealed condition,
    a pair of electrodes positioned in opposing relation to one another and adapted to be positioned in contact with the sealed portion to be inspected so that the sealed portion devoid of the contents is positioned between the pair of electrodes,
    a power supply unit connected to the opposed electrodes for supplying current to the pair of electrodes so that the opposed electrodes are oppositely charged,
    an electrical variable detecting unit for detecting an electrical variable in the sealed portion to be inspected, and
    a sealed condition device for judging the sealed condition of the sealed portion of the element based on the electrical variable.

2. The sealed condition inspection device according to claim 1, wherein said support unit of the element to be inspected is established in a conveyor for conveying the element to be inspected.

3. The sealed condition inspection device according to claim 1, wherein said support unit is a receiving board for receiving the element to be inspected to mount the element.

4. The sealed condition inspection device according to claim 1, wherein at least one of the pair of the said electrodes is movably disposed and can be located at an inspection position and a retreat position.

5. The sealed condition inspection device according to claim 1, wherein at least one of the pair of the said electrodes comprises a plurality of electrode elements.

6. The sealed condition inspection device according to claim 1, wherein the sealed portion is folded down over a surface of the element, and one of said electrodes comprises a wedge shaped portion positionable under the folded down sealed portion.

7. A method of inspecting a sealed condition of an element comprising:
    positioning an element adjacent a pair of opposing electrodes, the element being fabricated of a material and comprising a sealed portion at which portions of the material forming the element are sealed together;
    contacting the opposing electrodes to the sealed portion of the element at opposite sides of the sealed portion;
    supplying electric current to the electrodes in contact with the sealed portion so that the opposing electrodes are oppositely charged;
    detecting an electrical variable in the sealed portion; and
    judging a sealed condition of the sealed portion based on the detected electrical variable.

8. The method according to claim 7, wherein the sealed portion is folded down over a surface of the element, the method further comprising positioning one of the electrodes under the folded down sealed portion so that the one electrode is positioned between the surface of the element and a facing surface of the folded down sealed portion.

9. The method according to claim 7, wherein the element is a packaging container containing contents, and the sealed portion contacted by the electrodes is devoid of the contents.

10. The method according to claim 7, wherein the sealed portion of the element comprise dielectric material so that the sealed portion functions as a condenser when the electric current is supplied to the sealed portion by way of the electrodes.

11. A sealed condition inspection device for inspecting a sealed condition of a sealed portion of a contents containing element, wherein the sealed portion is formed by portions of the element being sealed together comprising
   a support unit for supporting the element to be inspected for the sealed condition,
   a pair of electrodes adapted to be positioned in contact with the sealed portion to be inspected at positions across from one another so that the sealed portion devoid of the contents is positioned between the pair of electrodes,
   an electrical variable detecting unit for detecting an electrical variable in the sealed portion to be inspected,
   a sealed condition device for judging the sealed condition of the sealed portion of the element based on the electrical variable, and
   wherein the sealed portion is folded down over a surface of the element, and one of said electrodes comprises a wedge shaped portion positionable under the folded down sealed portion.

12. A method of inspecting a sealed condition of an element comprising:
   positioning an element adjacent a pair of electrodes, the element being fabricated of a material and comprising a sealed portion at which portions of the material forming the element are sealed together, the sealed portion being folded down over a surface of the element;
   positioning one of the electrodes under the folded down sealed portion so that the one electrode is positioned between the surface of the element and a facing surface of the folded down sealed portion;
   contacting the electrodes to the sealed portion of the element at opposite sides of the sealed portion;
   supplying electric current to the electrodes in contact with the sealed portion;
   detecting an electrical variable in the sealed portion; and
   judging a sealed condition of the sealed portion based on the detected electrical variable.

* * * * *